(12) United States Patent
Gill et al.

(10) Patent No.: US 12,219,011 B2
(45) Date of Patent: Feb. 4, 2025

(54) SENSOR DATA INTERPRETER/CONVERTER METHODS AND APPARATUS FOR USE IN LOW POWER WIDE AREA NETWORKS (LPWANS)

(71) Applicant: 13486826 Canada Inc., Scarborough (CA)

(72) Inventors: Walter Gill, Cologne (DE); Helge Mimberg, Bergisch Gladbach (DE); Giuseppe Zampino, Markham (CA); Chaim Pressman, Vaughan (CA); Evgeni Kolev, Toronto (CA); Wolfgang Thieme, Schwaig (DE)

(73) Assignee: BEHR TECHNOLOGIES INC., Scarborough (CA)

( * ) Notice: Subject to any disclaimer, the term of this patent is extended or adjusted under 35 U.S.C. 154(b) by 0 days.

(21) Appl. No.: 17/998,457

(22) PCT Filed: Mar. 16, 2021

(86) PCT No.: PCT/IB2021/052195
§ 371 (c)(1),
(2) Date: Nov. 10, 2022

(87) PCT Pub. No.: WO2021/186351
PCT Pub. Date: Sep. 23, 2021

(65) Prior Publication Data
US 2023/0283668 A1    Sep. 7, 2023

Related U.S. Application Data

(60) Provisional application No. 62/991,369, filed on Mar. 18, 2020.

(51) Int. Cl.
*H04L 67/12*     (2022.01)
*H04L 51/066*    (2022.01)
(Continued)

(52) U.S. Cl.
CPC ............ *H04L 67/12* (2013.01); *H04L 51/066* (2013.01); *H04L 67/565* (2022.05); *H04L 2101/681* (2022.05)

(58) Field of Classification Search
CPC . H04L 67/12; H04L 67/565; H04L 2101/681; H04L 51/066
See application file for complete search history.

(56) References Cited

U.S. PATENT DOCUMENTS

2015/0189005 A1*    7/2015    Dubois ................. H04L 67/565
                                                      709/217
2017/0163735 A1*    6/2017    Sun ....................... H04L 67/565
(Continued)

FOREIGN PATENT DOCUMENTS

EP             2801962 A1    11/2014
WO     WO-2017203488 A1    11/2017

OTHER PUBLICATIONS

El-Aasser, Minar, Amr Gasser, Mohammed Ashour, and Tallal Elshabrawy, "Performance Analysis Comparison between LoRa and Frequency Hopping-based LPWAN", IEEE, 2019 IEEE Global Conference on Internet of Things (GCIoT). (Year: 2019).*

*Primary Examiner* — Nam T Tran
(74) *Attorney, Agent, or Firm* — Perry + Currier Inc.

(57) ABSTRACT

Sensor data interpreter/converter methods and apparatus interpreting and converting sensor data transmitted by a plurality of sensors in a Low Power Wide Area Network (LPWAN) (in the up-link) in a unidirectional network and, in a bidirectional network, also converting human readable formatted information into sensor compatible machine-readable byte array data (in the downlink) are described. The interpreter/converter methods and apparatus utilize blueprints that fully define the sensors (nodes) connected in the LPWAN. The blueprints include components providing information of every possible input and output an associated (Continued)

sensor has. The blueprints determine how the interpreter/converter functions when converting sensor data to human readable formatted information in the uplink, and when converting human readable formatted information to sensor compatible machine-readable byte array data in the downlink. The blueprints are structured to optimize the efficiency of transmissions in limited data bandwidth LPWANs.

12 Claims, 4 Drawing Sheets

(51) Int. Cl.
    *H04L 67/565*     (2022.01)
    *H04L 101/681*     (2022.01)

(56) References Cited

U.S. PATENT DOCUMENTS

| | | | |
|---|---|---|---|
| 2018/0176862 A1* | 6/2018 | Malas | H04L 67/565 |
| 2018/0341500 A1 | 11/2018 | Yamato | |
| 2021/0360071 A1* | 11/2021 | Chakraborty | H04L 67/565 |

\* cited by examiner

SENSOR DATA INTERPRETER/CONVERTER METHODS AND APPARATUS FOR USE IN LOW POWER WIDE AREA NETWORKS (LPWANS)

CROSS-REFERENCE TO RELATED APPLICATIONS

This application claims priority to U.S. Provisional Application No. 62/991,369, filed Mar. 18, 2020, the entirety of which is incorporated herein by reference.

FIELD

The present invention relates to sensor data interpreter/converter methods and apparatus interpreting and converting data transmitted to and/or from a plurality of sensors in a Low Power Wide Area Network (LPWAN).

BACKGROUND

A low power wide area network (LPWAN) or low power network (LPN) is a type of wireless telecommunications wide area network designed to facilitate long-range communications at a low bit rate among connected objects or apparatus, such as battery powered sensors. As is well known, Low Power Wide Area Networks (LPWANs) comprise wireless technologies having characteristics such as large coverage areas, low bandwidth, possibly very small packet and application-layer data sizes, and long battery life operation. Most technologies in this space aim for a similar goal of supporting large numbers of very low-cost, low-data-throughput devices with very low power consumption, so that even battery-powered devices can be deployed for years. LPWAN devices also tend to be constrained in their use of bandwidth, for example, with limited frequencies being allowed to be used within limited duty cycles (usually expressed as a percentage of time per hour that a device is allowed to transmit). As the name implies, one common goal of LPWA networks is coverage of large areas.

LPWANs are often used to create private wireless sensor networks. Typical implementations of LPWANs have relatively low data rates ranging from 0.3 kbit/s to 50 kbit/s per channel. A number of LPWAN networks are described in the prior art. One such prior art LPWAN is referred to as the "Telegram Splitting Ultra-narrow Band" (TS-UNB)) family of LPWANs and is defined in the European Telecommunications Standards Institute (ETSI) TS 103 357 V1.1.1 (2018-06) technical specification (referred to hereafter as "the TS-UNB standard"), available on the world wide web at https://www.etsi.org/deliver/etsi_ts/103300_103399/103357/01.01.01_60/ts_103357v010101p.p df, the contents of which are incorporated herein as if set forth in full. The TS-UNB standard represents a breakthrough in a primary barrier to worldwide Internet of Things ("IoT") scalability. As described in the above-incorporated ETSI TS 103 357 specification, the TS-UNB standard provides a low-power, wide-area network (LPWAN) protocol that is designed for massive industrial and commercial IoT deployments. The TS-UNB standard uses "Telegram Splitting"—the core of the TS-UNB protocol, which is designed to overcome the scalability, interference and mobility issues of legacy wireless "IoT" implementations.

In accordance with the TS-UNB standard, messages are divided into multiple subpackets and transmitted at different times and frequencies. Dramatically reduced on-air transmission time combined with pseudo-randomness and enhanced channel coding provide improved robustness against external interference while increasing overall system capacity. TS-UNB data packets can travel over 15 km. Only a few base stations are required for full coverage in vast areas such as industrial complexes, campuses or oilfields. Optimized for power efficiency, the TS-UNB standard facilitates increased sensor battery life as compared with other LPWAN solutions. Sensor batteries do not need frequent replacement or recharging as a result.

The TS-UNB standard provides a Low Power Wide Area Network (LPWAN) solution dedicated for private IoT Networks. The TS-UNB standard introduces a communication stack with a modern physical layer designed from ground up to withstand interferences and maximize quality of the wireless link. Enabling massive edge data collection at the start of the IoT value chain, TS-UNB related technology fuels real-time data input to powerful cloud analytics and application platforms. TS-UNB's Telegram Splitting technology provides improved robustness against interferences and improves overall system capacity through extremely short "on air" times.

FIG. 1 shows a typical low power wide area network (LPWAN) designed to accommodate a plurality of sensors. The LPWAN can be unidirectional (enabling data transfers from nodes to a base station) or bidirectional (enabling data transfer from nodes to the base station and from the base station to one or more nodes). The LPWAN architecture shown in FIG. 1 comprises a star network 100 with at least one central base station 102 receiving messages from and/or transmitting messages to a plurality of sensor nodes 104. In some embodiments, thousands of sensors 104 are employed over the wide area wireless communications network.

FIG. 2 shows an exemplary LPWAN 200 that may be used in operation with the sensor data interpreter/converter of the present invention. As shown in FIG. 2, the LPWAN 200 includes a plurality of sensors 202 in wireless communications with a base station 204. The base station 204 communicates with a "backend" computer 206 upon which one or more software applications 208 are executed. In some embodiments, the base station 204 includes an RF transceiver, an off-the-shelf personal computer (PC), a CPU, a hard disk, Random Access Memory (RAM) and other standard computer components.

In some exemplary embodiments of the LPWAN 200, the LPWAN 200 operates in accordance with the above-incorporated TS-UNB standard, either as a bidirectional or uni-directional network. However, it will be appreciated by those skilled in the wireless networking arts that the sensor data interpreter/converter of the present invention may be used in any convenient LPWAN and is not only limited for use in LPWANs made in accordance with the TS-UNB standard.

In accordance with a TS-UNB-based implementation, the sensors 202 are configured in a star network arrangement wherein the central base station 204 aggregates low data-rate messages transmitted to or from the plurality of sensors 202 over a Radio Frequency (RF) wireless communications link. In some embodiments, the sensors 202 may number in the hundreds or even thousands and may be battery-powered. As described in the incorporated TS-UNB standard, communication between the base station 204 and the sensors 202 can be achieved over a range approximating 15 km (in relatively flat terrain environments) and utilizing sub-GHz RF bands. The plurality of sensors 202 typically capture "field" data such as environmental parameters (e.g., temperature, humidity, etc.) and/or information related to machinery (such as in a factory environment) and transmit this information to the base station 204 (transmissions from the sensors 202 to the base station 204 are referred to herein as "uplink" communications, and transmissions from the base station 204 to the sensors 202 are referred to herein as "downlink" communications) at pre-defined time intervals using the RF communications link. The base station 204 collects messages transmitted by all of the sensors 202, processes and decrypts network control data, and forwards user data to the backend 206 via a backhaul connection. The backhaul connection typically has higher data throughput than does the RF link. For example, the backhaul connection may typically be implemented using an Ethernet or a Wi-Fi connection. In bidirectional communication networks, the base station 204 generates messages based on payload data received from the backend 206. These messages are then transmitted to the respective sensors 202 for remote command and control applications. As described in more detail below, the present sensor data interpreter/converter methods and apparatus is designed for use in interpreting and converting data transmitted from the sensors 202 via the uplink and for use in interpreting and converting data transmitted to the sensors 202 via the downlink.

In some embodiments, the backend comprises a service center and an application center. The service center is responsible for device and network management. All devices including the sensors 202 operating in the LPWAN 200 are registered within the service center for administration and operational control. The application center serves as a point of contact with end users or application operators.

The one or more software applications 208 may comprise software executable by and upon a server or cloud computing system. Typically, the software applications 208 execute core functions of data storage and/or data analytics. Sensor data patterns can be identified and/or demonstrated on user interfaces.

As noted above, the uplink data throughput and data rates associated with data transmissions from the plurality of sensors 202 to edge devices, or base stations 204, in LPWANs, as exemplified in and described by the TS-UNB standard, require sensor uplink data rates and data throughput to be extremely low. Downlink data throughput and data rates associated with data transmissions from the base station to the plurality of sensors is even more constrained than are the uplink data rates. Therefore, lowering the uplink and downlink data traffic between the plurality of sensors and the base station improves the performance characteristics of the LPWAN networks, and especially those adhering to the TS-UNB standard.

SUMMARY

The inventors have recognized a need to transmit uplink sensor data using a low data throughput implementation while also allowing the byte oriented "raw" machine-readable sensor data to be interpreted and converted into a human-readable and machine-readable common data format, such as the JSON format. The inventors have also recognized a need to transmit downlink data to the plurality of sensors using a low data throughput implementation while also allowing human-readable (for example, JSON-type text files in some embodiments) to be converted into machine-readable and sensor compatible formats. The present invention provides such methods and apparatus for interpreting and converting sensor data transmitted to and from a plurality of sensors in a low data bandwidth LPWAN. In the uplink, machine-readable sensor data is converted into common human-readable and machine-readable data formats such as the well-known JavaScript Object Notation (JSON) data format. In the downlink, the human-readable information is converted into machine-readable sensor data compatible with the sensors. A detailed description of the bidirectional interpreter/converter methods and apparatus are set forth in detail below.

Sensor data interpreter/converter methods and apparatus for use in Low Power Wide Area Networks (LPWANs) are described. In the uplink, the interpreter/converter receives sensor compatible machine-readable byte array data (sensor data) from a plurality of sensors in the LPWAN and converts the sensor data into machine and human readable formatted information, such as the well-known JSON format. Data structures, or "blueprints", are defined for use with the interpreter/converter. The blueprints are defined for each sensor type deployed in the LPWAN, and each blueprint is associated with corresponding and respective sensors of the same or similar types, or "sensor types", and with respective sensor-type identifiers that identify the types of sensors connected to the LPWAN. The interpreter/converter accesses the blueprint associated with a selected sensor and processes data transmitted to or from the selected sensor in accordance with the accessed blueprint.

Advantageously, the sensors need not transmit their sensor type identifying information, or "sensor-type" identifiers, when transmitting data payloads via the LPWAN. Rather, the present interpreter/converter maps LPWAN EUIs, which uniquely identify each sensor in the LPWAN, to sensor-type identifiers and to corresponding data structures/blueprints. In the downlink, the interpreter/converter receives human readable formatted information (such as JSON text files, for example) and converts that information to machine-readable byte arrays that are compatible with the sensors.

The blueprints are defined for each sensor type in the LPWAN and the blueprints may include uplink and downlink fields that determine how the interpreter/converter processes raw data payloads received from a selected sensor (in the uplink), and how the interpreter converts human readable formatted information into machine-readable byte arrays (in the downlink). In one embodiment, the blueprints comprise JSON text files that are created and defined whenever a sensor of a new sensor type is installed in the LPWAN. Once defined, the interpreter/converter uses the blueprint for a selected sensor type to determine how to process sensor data (in the up-link) or human readable formatted information (in the downlink). It is unnecessary to re-install or re-create blueprints when sensors of the same or similar type are added to the LPWAN. Newly added sensors are merely mapped to sensor-type identifiers and their associated blueprints whenever they are installed in the LPWAN.

The blueprints are defined to include metadata parameters such as, for example, a data length, a unit of measurement, and mathematical functions that are applied to sensor data components. In some embodiments, the blueprint includes multiple data payloads comprising different data components for a single sensor. In one embodiment, payload identifiers are used to identify the type of payload data transmitted by a given sensor. In some embodiments, the interpreter/converter uses a database or some other form of data lookup to map sensor LPWAN EUIs to sensor-type identifiers, and thus to associated and corresponding data structures/blueprints defined for a given sensor.

The details of one or more embodiments of the invention are set forth in the accompanying drawings and the descrip-

BRIEF DESCRIPTION OF THE DRAWINGS

Like reference numbers and designations in the various drawings indicate like elements.

DETAILED DESCRIPTION

Figure 1:
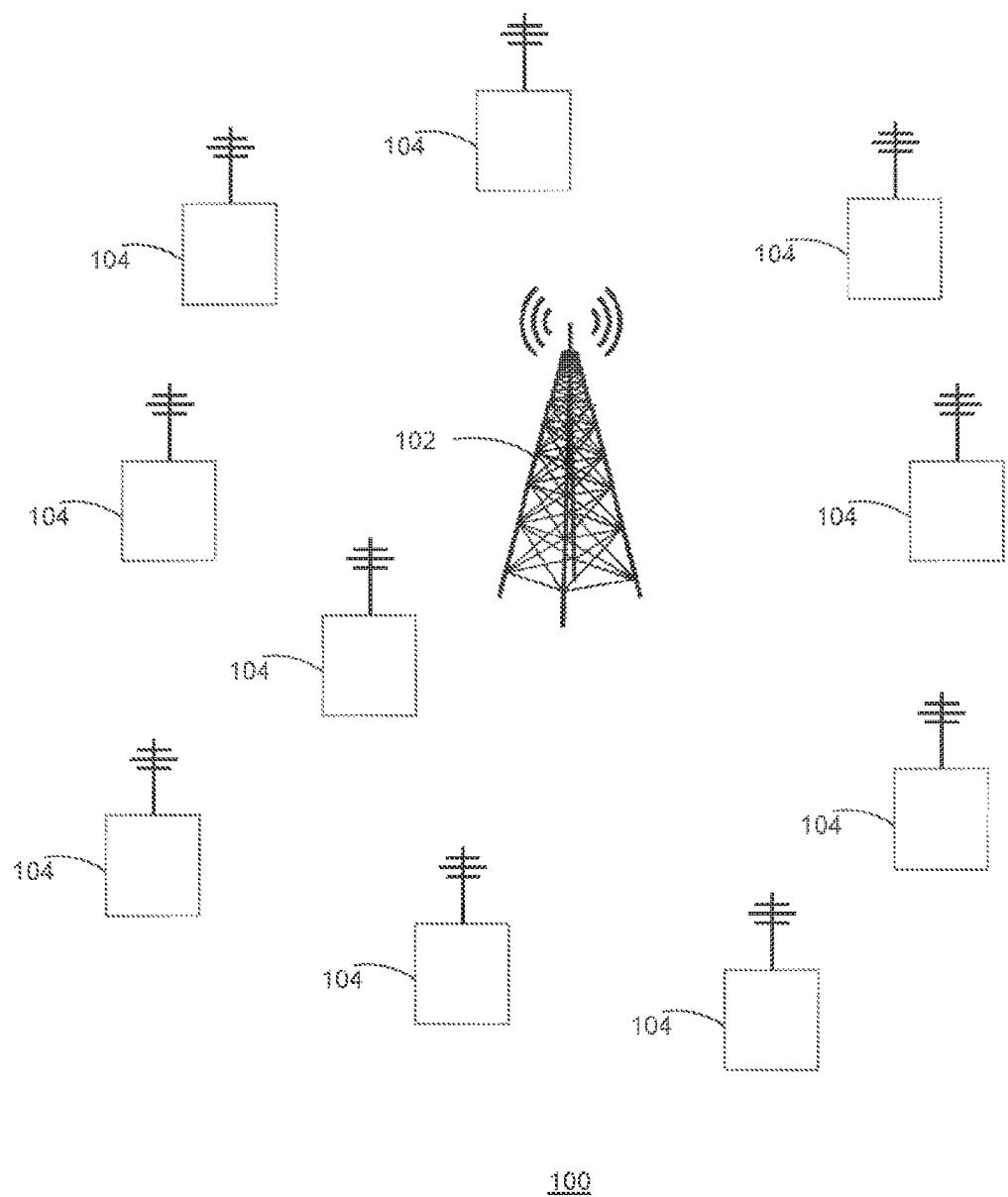
FIG. 1 shows a typical low power wide area network (LPWAN) designed to accommodate a plurality of sensors.

Sensor data interpreter/converter methods and apparatus interpreting and converting sensor data transmitted from and/or to a plurality of sensors in a Low Power Wide Area Network (LPWAN) are disclosed herein. In one embodiment of the present invention, data structures or "blueprints" (referred to herein as "blueprints") are defined, wherein the blueprints are associated with respective and corresponding data sensors in a LPWAN. The blueprints are used by the present interpreter/converter to interpret "raw" sensor data (referred to hereafter as "machine-readable byte array data") and convert the raw sensor data into machine and human readable JSON formats (or other formats such as, for example, XML, YAML, and TOML). The blueprints determine how the interpreter/converter converts the machine-readable byte array data into human readable formatted information in the uplink, and vice-versa, in the downlink. The inventive interpreter/converter is particularly useful in low throughput wireless communications such as those inherent in LPWA networks.

A myriad of sensors designed for use in LPWANs are available from a number of different sensor manufacturers. Sensor types and sensor data payloads can vary quite a bit. Every manufacturer specifies the sensor byte arrays that are transmitted by the sensors and may use differing sensor data formats. Sensor data formats can vary quite a bit from sensor to sensor and from manufacturer to manufacturer. Sensor data is typically transmitted and in byte streams or "byte arrays" which are provided in very compact formats. Because each manufacturer can specify different types of sensor data byte arrays (or machine-readable byte arrays), different interpretations of the sensor data are possible and can result in incorrect interpretations unless the type of sensor is known to or provided to the interpreter. In addition to having to accommodate different sensors and different sensor types, the present interpreter/converter must accommodate sensors capable of transmitting raw sensor data at different times and at different rates. For example, a temperature sensor may sense temperature at a very high sampling rate (say, for example, every 1 ms.) but only occasionally transmit its readings due to the low bandwidth requirements of the LPWAN. Alternatively, transmitted sensor data may reflect a "calculated" value produced by an "intelligent" sensor. For example, a sensor may transmit sensor data only if a selected value is exceeded or if a sensed reading goes below a specified threshold. So, in some embodiments, sensor data may comprise "real-time" or processed/prepared sensor data. The present interpreter/converter is able to accommodate and accurately convert all such sensor data into the JSON or other human readable/machine readable formats. The present interpreter/converter accurately converts the sensor data whether it be "real-time" or "pre-processed" sensor data.

In some embodiments, a JSON text file is used to implement the data structures/blueprints used by the present interpreter/converter in order to define how the sensor data byte arrays are interpreted and converted into human readable/machine readable JSON format. In one embodiment, the text file, or blueprint, is created and defined when sensors are installed on the LPWAN. In some embodiments, the blueprint is defined for a new sensor type using a user interface provided by a software application running on the backend computer such as, for example, the backend computer 206 described above with reference to FIG. 2. Although the blueprints are described herein as being implemented using JSON text files, any other convenient implementation of the blueprints may be used to implement the present inventive interpreter/converter. For example, in some embodiments, the blueprints may comprise XML, YAML, or TOML text files, or any other convenient markup computer language files or structured file formats.

Once a blueprint is defined for a sensor that transmits data payloads of a given data type, it does not need to be re-created or re-installed every time another sensor of the same type is installed on the LPWAN. After the blueprint is created and stored, it thereafter defines how similar or identical sensor data is interpreted and converted by the present data interpreter/converter. It is unnecessary to re-install or re-create blueprints when sensors of the same or similar type are added or removed from the LPWAN. All that would be required is to remove an associated blueprint when its associated and respective sensor type is retired from the LPWAN. The blueprint defines how data received from identical sensors or sensors of the same type are converted by the present interpreter/converter. In some embodiments, the blueprints also include "downlink" information and related downlink components defining how messages are transmitted to a selected sensor. The downlink information defines how the present sensor data interpreter/converter converts human readable formatted information into machine-readable byte array data transmitted to a selected sensor.

As described in more detail below, the blueprint defines how the present interpreter/converter converts received sensor byte array data into a JSON format (or other human and machine-readable format such as, for example, XML, YAML and TOML) or other convenient format. The resultant human and machine readable format is usable by any type of end service or any cloud requiring use of the sensor data.

The data structure or blueprint used to implement the present interpreter/converter is defined to include metadata parameters, such as, for example, a data length in bits, a unit of measurement, and mathematical functions that are applied to sensor data components. The blueprint may, in some embodiments, define multiple data payloads comprising different data components for a single sensor. In one embodiment, an 8-bit identification number is provided allowing up to 256 data payloads to be transmitted by and received from a single sensor and allowing the data payloads to be interpreted and converted into a common machine-readable and/or human-readable format such as JSON. The 8-bit identification number is used to identify the number of data payloads that may be transmitted to or by a given sensor, however those skilled in the computer arts shall recognize that other identifier lengths may be used as is convenient to the system designer, and in no way is the scope of the present interpreter/converter limited thereby.

Exemplary partial and more fully developed data structures/blueprints are set forth below and described in the following paragraphs:

```
{
    ....
    "temperature": {
        "size": 12,
        "type": "uint",
        "func": "/100",
        "unit": "degree celsius"
    }
    .....
}
```

Blueprint Example A—Exemplary "Partial" Data Structure/Blueprint

Blueprint Example A sets forth a partial data structure/blueprint including a data component that is referenced or identified by its name. In the exemplary partial blueprint, the data component name comprises "temperature". The data component further comprises the size or length of the data payload (size is provided in bits in this example) and a datatype. In the exemplary partial blueprint set forth in Example A, the datatype is "uint", which stands for an unsigned integer. Additionally, the data component defines how the present interpreter/converter interprets and converts data into a decoded value (this is provided as "func, unit" in the exemplary partial blueprint).

For the partial blueprint of Example A, because the size of the data payload is given as "12", the present interpreter/converter extracts 12 bits of data from the sensor data that is received from a selected sensor associated with the partial blueprint of Example A. For example, assume for the purposes of illustration that the 12 bits of data comprises the binary number "1010 1011 1100", or given in hexadecimal as "0xABC". Because the data component defines the data type as an unsigned integer ("unit"), the 12-bit data is interpreted by the present interpreter/converter as decimal "2748" (because hexadecimal "0xABC"=decimal "2748"). The "func" part of the data component instructs the interpreter/converter to divide this number by 100 ("/100") resulting in a decimal number "27.48" (because 2748/100=27.48). The "unit" part of the data component defines that the resultant value is an unsigned integer. The last part of the partial blueprint defines the temperature data as being in degrees Celsius. Therefore, when the selected sensor defined by the partial blueprint of Example 1 transmits a data payload having a hexadecimal value "0xABC", the present interpreter/converter interprets that information as temperature information, and further that the selected sensor transmitted a temperature value of 27.48 degrees Celsius.

As described above with reference to the "func" part of the data component, in addition to translating the sensor machine-readable byte array data into a human-readable (and also machine-readable) format (such as JSON), the present sensor interpreter can also perform simple functions, for example, mathematical functions, on the transmitted sensor byte array data. For example, assume that byte array temperature data is transmitted by a selected sensor in Kelvin. The blueprint may be used by the present sensor data interpreter/converter to not only translate the byte array data into a JSON human-readable form, it may also be used to convert the temperature information from degrees Kelvin to degrees Celsius. As will be appreciated by those skilled in the sensor technologies and LPWAN arts, temperature is only one type of sensor data that can be converted and interpreted by the present sensor interpreter/converter, and it is only one example of sensor data that can have simple functions (such as mathematical functions) performed thereon. Specifically, conversion from Kelvin-to-Celsius is just one exemplary mathematical function that can be performed on the received sensor data.

As defined in the above-incorporated TS-UNB standard, in one embodiment, each sensor that transmits sensor data via the exemplary LPWAN (or that receives messages in the downlink) is assigned a lifetime IEEE standardized EUI64 address (or hereafter, "a LPWAN EUI") at production for unique identification in the LPWAN. The LPWAN EUI uniquely identifies each sensor connected to the LPWAN. This sensor identification is necessary for proper operation of the sensors in the LPWAN. Those skilled in the wireless networking and computing arts shall recognize that LPWAN EUIs are only one type of identifier that can be used to uniquely identify the sensor in the LPWAN. Any other identifier that uniquely identifies the sensor or endpoint in the LPWAN can be used to implement the present invention. Each LPWAN EUI uniquely identifies each sensor (node) operating in the LPWAN. In order to function correctly, the sensors transmit their unique associated and corresponding LPWAN EUIs together with their sensor data payloads. Importantly, the present interpreter/converter methods and apparatus require that each sensor identify itself by transmitting its LPWAN EUI, and only its LPWAN EUI, when transmitting its data payload information (i.e., its machine-readable byte array data) in the LPWAN. This is especially important given the inherently low data throughputs available in LPWA networks. The LPWAN EUI is not part of the interpreted raw sensor data payload and is stripped from the raw sensor data payload when the present interpreter/converter converts the raw sensor data into a human/machine readable format.

As described in more detail below, the present interpreter/converter properly interprets and converts sensor data by advantageously using "sensor-type" identifying information, or a "sensor-type identifier", that is not required to be transmitted over the LPWAN. The sensor-type identifier used by the present interpreter/converter is "mapped" to, or is referenced to, selected sensors of the same type, and to the selected sensors' unique LPWAN EUIs. In addition to being mapped to sensor LPWAN EUIs, the sensor-type identifier identifies, or references, the blueprint that the present interpreter/converter uses when converting data payloads received from the sensors mapped thereto. In accordance with the present interpreter/converter methods and apparatus, a relationship between the LPWAN EUIs and the sensor-type identifiers is defined and stored in order to relate each sensor's LPWAN EUI with its associated and corresponding sensor type, and with its associated and corresponding blueprint. The present interpreter/converter method and apparatus uses this relationship to avoid the necessity of sensors having to transmit their associated sensor-type EUIs in every telegram transmitted therefrom.

This saves tremendous overhead data bandwidth that would otherwise be required. Additionally, the present inventive interpreter/converter advantageously defines and uses sensor blueprints that allow data having different data types to be properly converted into human-readable formats. The sensor data conversion function is performed without requiring the sensors to transmit their data types over the LPWAN.

In some embodiments, each data structure/blueprint is assigned a unique 64-bit hexadecimal sensor-type EUI or identifier that uniquely identifies it from the plurality of blueprints. Although one embodiment of the present invention uses EUIs to identify and reference the data structures/blueprints, those skilled in the wireless communication arts shall recognize that any convenient blueprint identifier may be used to implement the present interpreter/converter, and that EUIs are simply one type of identifier that may be used to reference the blueprints.

The number of sensors connected to the LPWAN may number in the hundreds or even thousands, and each sensor has a unique TS-UNB EUI (or LPWAN EUI) that uniquely identifies its transmissions in the LPWAN. However, in contrast, in some embodiments of the present interpreter/converter, all sensors of the same type use only one sensor-type identifier (or sensor-type EUI) that is used by the present interpreter/converter to accurately identify, define, and interpret the data transmitted by sensors of the same sensor type. Therefore, in some embodiments, no matter how many sensors are produced by a sensor manufacturer, and no matter how many of that type are implemented in a given LPWAN, all sensors of the same type have one and only one sensor-type EUI, and all sensors of the same type have only one blueprint associated therewith. In other embodiments, multiple blueprints are provided having different LPWAN EUI and sensor-type EUIs, wherein the blueprints are assigned to sensors transmitting the same type of sensor data payload information. This functionality is implementation-specific.

For a sensor's data payload to be interpreted properly, the present inventive interpreter/converter maps or references the sensor-type EUI or ID of the blueprint to sensor data payloads (by mapping each sensor's LPWAN EUI to a pre-defined blueprint associated with the LPWAN EUI) and interprets/converts the payload according to the contents of the referenced pre-defined blueprint. In the case of a multi-payload sensor (i.e., a sensor capable of transmitting multiple data payloads), in some embodiments, the first byte of the sensor's payload corresponds to a specific payload ID assigned in the payload definition (0-255). In other embodiments (for example, those adhering to the TS-UNB standard), the sensor transmits the payload ID in a header of the message transmitted by the sensor. Multiple payload blueprints are now described in more detail with reference to the blueprints set forth in Examples B and C below.

Another more fully developed partial data structure/blueprint is set forth in Example B below including an "uplink" field and comprising multiple components:

```
{
  "uplink": [
    {
      "id": 101,
      "payload": [
        "temperature",
        "4bitnumber"
      ]
    },
    {
      "id": 99,
      "payload": [
        "humidity",
        "12bitnumber",
        "4bitnumber"
      ]
    }
  ]
}
```

Blueprint Example B—Exemplary "Partial" Data Structure/Blueprint Including "Unlink" Field and Multiple Components for Sensor Data Transmissions in the Uplink As shown above in the exemplary partial data structure/blueprint of Example B, in some embodiments, the blueprint includes a "uplink" field. The "uplink" field is used by the present interpreter/converter in interpreting/converting messages transmitted by the plurality of sensors in the uplink to the base station. The uplink field includes the different data payload types (the payloads comprise a list or array of components used by the present interpreter/converter to accurately interpret and convert sensor data payloads) and different payload identifiers ("id") associated with a corresponding sensor's payload. The payload identifiers allow the present interpreter/converter to correctly identify and convert the data payload information transmitted by the sensors in the uplink, especially when the sensors are capable of transmitting different types of sensor data payloads such as, for example, temperature and humidity data. For example, some sensors are capable of sensing and transmitting different types of sensed information depending upon the sensor's capabilities. The payload identifiers are used to identify exactly the type of payload data the sensor is currently transmitting in a selected sensor data payload. The payload identifiers identify which payload definition in the blueprint should be used by the interpreter/converter when converting sensor machine-readable data received from a selected sensor.

As shown above in the partial blueprint of Example B, the uplink field shows the corresponding data payloads (or payload definitions) and their payload identifiers, wherein the payloads comprise a list or array of data components. Whenever the present interpreter/converter receives a data payload from a selected sensor, it determines the appropriate data structure/blueprint to use in order to properly and accurately convert the sensor data payload into the machine and human readable JSON format. The interpreter/converter makes this determination based upon the LPWAN EUI that is transmitted together with the sensor data payload. Once this association is determined, the present interpreter/converter references the sensor's associated and corresponding blueprint (based on the mapping of LPWAN EUIs to sensor-type EUIs), and uses the structure defined by the associated and corresponding blueprint to convert the sensor data payload into human-readable JSON format (or other formats such as, for example, XML, YAML and TOML). This JSON format is derived from the blueprint definition and uses the name of each component in the blueprint as an element of the human-readable JSON format. The actual conversion process that is performed by the present interpreter/converter is described in greater detail with reference to two sensor data-to-JSON examples set forth in more detail below (ee, e.g., Examples I. and II. below). As noted above, although JSON formats are set forth in Examples I. and II. below, the scope of the present interpreter/converter encompasses other machine readable and human readable formats such as, for example, the XML, YAML and TOML human readable formats.

In some embodiments, the interpreter/converter uses a form of database or data lookup table to perform the mapping of LPWAN EUIs to sensor-type EUIs in order to reference the appropriate blueprint for a given selected sensor. As noted above, the inventive methods and apparatus eliminate a need for sensors on the LPWAN to transmit their unique sensor-type EUI identifiers in each payload. Asynchronous LPWA networks do not provide the technical capability for handshake requesting and exchanging of sensor information, making the present interpreter/converter methods and apparatus essential to ensuring device interoperability across multiple sensor vendors.

Also, in the downlink, LPWANs do not provide a broadcast capability for broadcasting messages to more than one sensor at a time. Each selected sensor must be uniquely addressed in order to transmit messages to the selected sensor in the downlink. As described in more detail below, the present interpreter/converter uses blueprints which define all of the sensors in the LPWAN. More specifically, the blueprints define how the interpreter/converter processes messages sent to the sensors in the downlink (for use by the sensors), and how it processes messages transmitted by the sensors in the uplink. Downlink messages may be used to configure or reconfigure the sensor operation in the LPWAN (for example, downlink messages can be used to dictate how much power a sensor can use to transmit its sensor data, how long it is permitted to transmit on the LPWAN, sensor accuracy requirements, frequency of sensor transmissions, the type of sensor data to be transmitted, etc.). The blueprint approach defined herein enables interoperation between different sensor manufacturers and base station manufacturers in large scale network deployments using an interoperable low overhead format.

A more fully developed exemplary data structure/blueprint for use with the present interpreter/converter is set forth below in Example C:

```
{
    "name": "Example Sensor",
    "vendor": "BehrTech",
    "type": "70ABC5C1F000A000",
    "identifier": true,
    "uplink": [
        {
            "id": 101,
            "payload": [
                "temperature",
                "4bitnumber"
            ]
        },
        {
            "id": 99,
            "payload": [
                "humidity",
                "12bitnumber",
                "4bitnumber"
            ]
        }
    ],
    "components": {
        "temperature": {
            "size": 12,
            "type": "uint",
            "func": "",
            "unit": "degree celsius"
        },
        "4bitnumber": {
            "size": 4,
            "type": "uint",
            "func": "",
            "unit": ""
        },
        "humidity": {
            "size": 16,
            "type": "uint",
            "func": "/100",
            "unit": "percent"
        },
        "12bitnumber": {
            "size": 12,
            "type": "uint",
            "func": "",
            "unit": ""
        }
    }
}
```

Blueprint Example C—Exemplary Data Structure/Blueprint Including Multiple Components An exemplary more fully developed blueprint set forth in Example C above includes a sensor name field ("Example Sensor"), a vendor name field ("BehrTech"), a sensor-type EUI identifier field ("70ABC5C1F000A000"), an "identifier true/false" field (in the exemplary blueprint of Example C this is given as "true"), the above-described "uplink" field including payload identifiers, and multiple components. As described above, the "uplink" field and its related payloads and components define how uplink messages transmitted by the plurality of sensor are interpreted and converted. As set forth in the exemplary blueprint of Example C, the components are identified by the data types available from the sensors associated with the Example C blueprint: specifically, "temperature" and "humidity". The actual sensor data interpretation and conversion into JSON format performed by the present interpreter/converter is described in greater detail with reference to the two sensor data-to-JSON conversion examples, Examples I. and II., set forth below.

As described above with reference to the Example B blueprint and described in more detail now with reference to the Example C blueprint, the blueprints include "payload identifiers" that are used to precisely identify the type of payload information a sensor is transmitting in the uplink in a selected payload. As shown in the Example C blueprint, for example, the present interpreter/converter has the ability to interpret different payloads that are transmitted by a single selected sensor. The present interpreter/converter can receive multiple different data payloads from a single sensor. The payload identifiers identify the type of data being transmitted by the selected sensor. The present interpreter/converter uses the payload identifiers to accurately identify the data contained in the sensor data payload.

For example, assume that a selected sensor is capable of measuring both temperature and humidity. Assume further that temperature data is transmitted by the selected sensor every minute, and that humidity data is transmitted every hour. When the present interpreter/converter receives the payload from the sensor, the interpreter/converter will determine whether the payload contains temperature information or humidity information, or some other type of data. The keyword "identifier," shown in the Example C blueprint is set to either "false" or "true". If the keyword "identifier" is set to "true", as shown in the Example C blueprint, then, in some embodiments, the very first byte of the payload is read by the present interpreter/converter. In these embodiments, the very first byte of data transmitted by the sensor comprises a payload identification number, or "payload identifier". In other embodiments (for example, those adhering to the TS-UNB standard, the payload identifier (or payload "id") may be transmitted as part of the message header. However it is transmitted, once received, the payload identifier is used by the interpreter/converter to look into the "uplink" part of the blueprint (see, for example, the Example C blueprint), where payload "id" numbers identify the type of data that is being transmitted in the selected sensor. The present interpreter/converter looks into the "uplink" part of the blueprint and interprets the sensor data according to the payload identifier contained in the very first byte of the sensor data payload. For example, if the payload identifier (or "id" as shown in the Example C blueprint) is "101", the payload contains temperature information. The payload identifier of "101" instructs the interpreter/converter to use the "temperature" payload defined in the blueprint. This payload (or payload "definition") includes the list of two components: "temperature" and "4bitnumber". These components are further defined in the blueprint (after the "components" field). Alternatively, if the payload identifier is "99", the payload contains humidity information, and the data is interpreted/converted in accordance with the "humidity" payload definition (i.e., the payload definition following the id "99" comprising the following array of components: "humidity", "12bitnumber" and "4bitnumber". As before, these components are further defined in the components section of the blueprint.

Figure 2:
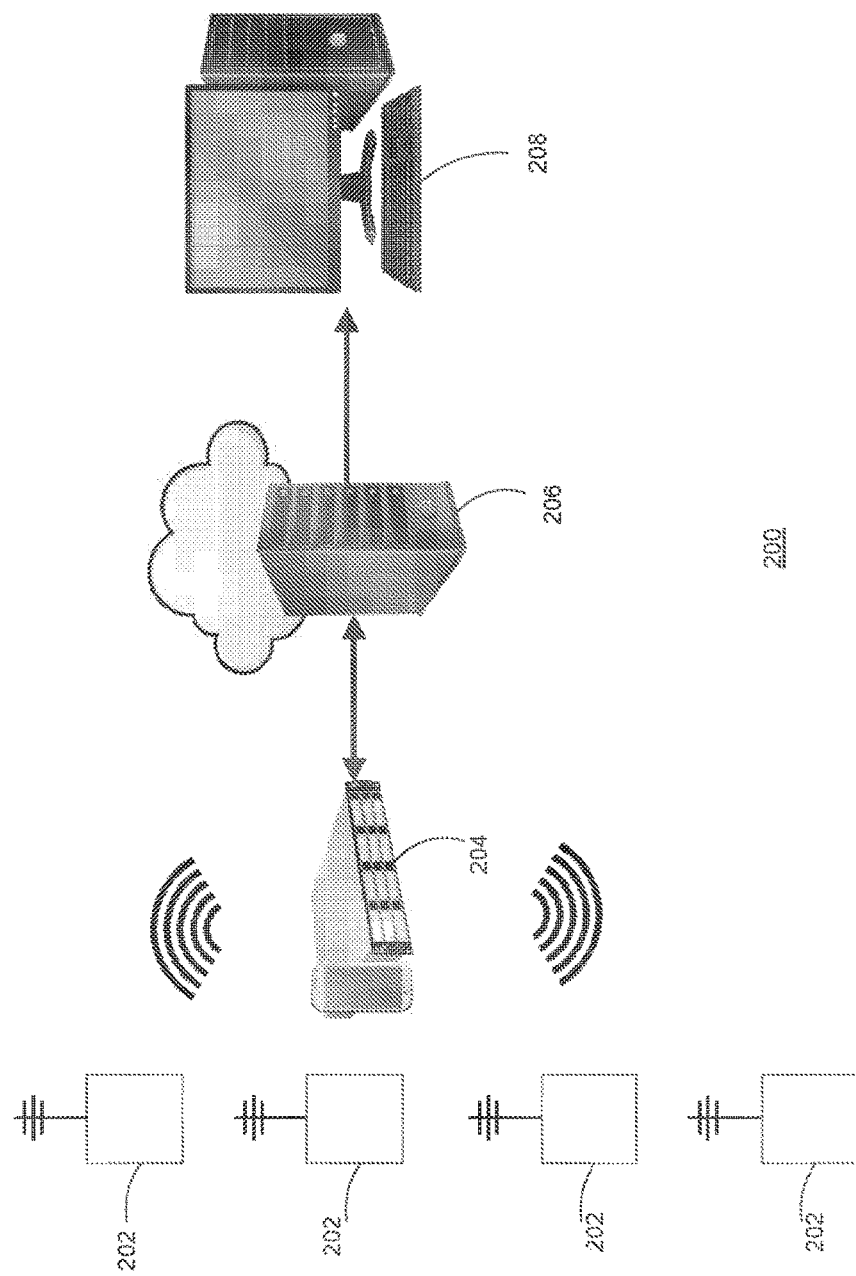
FIG. 2 shows an exemplary LPWAN that may be used in operation with the sensor data interpreter/converter of the present invention.
Figure 3A:
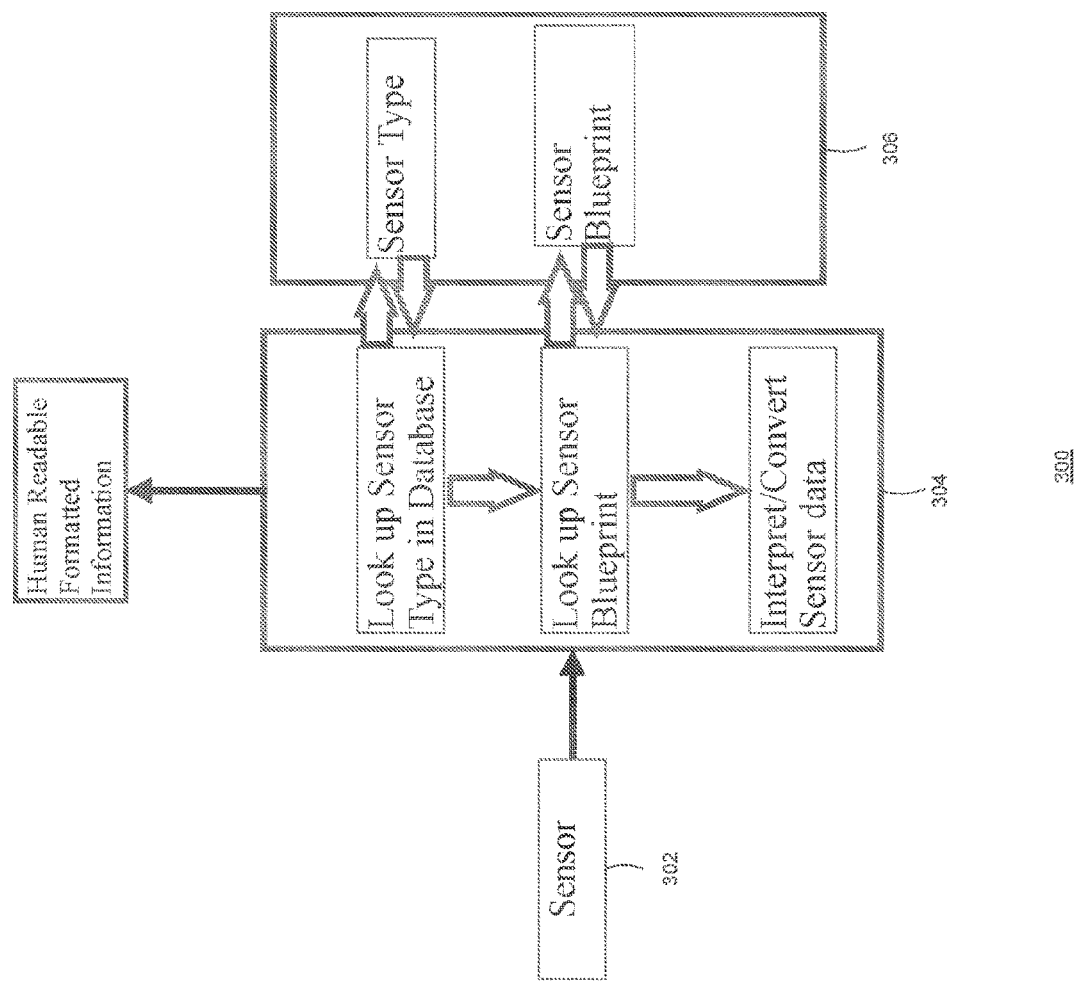
FIG. 3a shows an exemplary data flow showing how machine-readable byte array sensor data is interpreted and converted to human readable formatted information in the uplink, using the sensor data interpreter/converter of the present invention.

FIG. 3a shows an exemplary data flow 300 showing how machine-readable byte array sensor data is interpreted and converted to human readable formatted information in the uplink, using the sensor data interpreter/converter of the present invention. As shown in the exemplary data flow 300 of FIG. 3a, in the uplink, raw sensor data is received from an "endpoint" or sensor 302. The sensor data includes sensor identifying information such as the LPWAN EUI identifying information described above. The sensor data also includes the sensor data payload. As shown in FIG. 3a, the sensor data is input into the present interpreter/converter 304 wherein the sensor data is interpreted and converted into a machine and human readable data format. As described above with reference to the LPWAN 200 of FIG. 2, the interpreter/converter 304 includes a transceiver (typically an RF transceiver) used to receive messages from the plurality of sensors (in the uplink) and to transmit messages to the plurality of sensors (in the downlink). The transceiver may, in some embodiments, be implemented in the base station (such as, for example, base station 204 of FIG. 2). As described above, and as shown in FIG. 3a, in some embodiments the data interpretation and conversion is performed by the interpreter/converter 304 by (1) looking up the sensor type associated with the sensor 302 and its sensor data (specifically, the sensor type that is associated and corresponds to the sensor's LPWAN EUI), (2) looking up the sensor blueprint associated with the sensor type, and (3) interpreting/converting the sensor data in accordance with the sensor blueprint associated with the sensor type. As shown in FIG. 3a, and as described above in more detail, in some embodiments, the sensor type and its associated and corresponding blueprint is stored in a database 306. After performing the conversion the human readable formatted information is output by the interpreter/converter 304 as shown in FIG. 3a.

In one exemplary embodiment of the present interpreter/converter, the blueprint (or JSON text file in some embodiments) is stored in a database accessible via the LPWANs of FIGS. 1 and 2. Although the database is not shown in the LPWANs of FIGS. 1 and 2, those skilled in the wireless communications arts shall recognize that the database may be stored in and connected to any convenient accessible device in the LPWAN 100 and 200. For example, in the LPWAN 100 shown in FIG. 1, the database may be implemented as part of the LPWAN gateway 102.

Those skilled in the LPWAN arts shall appreciate that other means may be used to store the blueprint without departing from the scope or spirit of the present invention. It is not essential where the blueprints are stored as long as the blueprints are accessible by the service center. Although the blueprints are stored in a database in the service center in some embodiments, the blueprints could be stored in a data storage cloud, for example. In other embodiments, the blueprints could be stored in a file share system. Alternatively, the blueprints could be distributed across multiple databases. In some other embodiments, if a blueprint is not already stored in a database or data lookup that is directly accessible to the interpreter/converter 304, the blueprint can be provided by a selected sensor or end point. Given the highly limited bandwidth available in TS-UNB LPWANs, the blueprint is compressed prior to being transmitted in the up-link by the end node or sensor. In order to accomplish this data compression of the blueprint, only the values of the blueprint (and not the entire structure of the blueprint) are transmitted in the uplink by the sensor or end point. The backend system (such as, for example, the backend computer 206 described above with reference to FIG. 2) receives the blueprint values transmitted by the end node or sensor and parses them into an "empty" blueprint. This blueprint is then stored in the database or data lookup to be accessed by the interpreter/converter as described in more detail above.

Those skilled in the wireless communication arts shall recognize that the present interpreter/converter may be implemented in any convenient device in the LPWAN. For example, in some embodiments, the present interpreter/converter is implemented in a so called "Edge Device" which is typically a base station capable of transmitting and receiving RF wireless transmissions via the LPWA network. The present interpreter/converter may be implemented using any convenient means including but not limited to application layer software executing on an Edge Device or base station (such as, for example, the base station 204 of FIG. 2). The interpretation/conversion function is performed wherever the interpreter/converter is executed (that is, wherever it is executed by a device), such as, for example, when a base station implements the interpreter/converter function by executing software instructions on a CPU in the base station.

Two Examples of Uplink Sensor Data Interpretation/Conversion

Two examples of uplink sensor data interpretation and conversion into a JSON format are described below using two exemplary sensor data type blueprints which are set forth below in Tables A and B.

Example I.—Interpreting Payload without ID (Using a STI-MM06 Payload)

For this example, the payload of an STI-MM06 sensor without ID is used.

UserData: integer representation: [96 11 185 48 3 235 0 1 65 0 0 40 0]; hexadecimal representation: [0x60 0x0b 0xb9

0x30 0x03 0xeb 0x00 0x01 0x41 0x00 0x00 0x28 0x00];
which hexadecimal number comprises an array of 13 Bytes.

This example is given for an STI-MM06 sensor having the sensor blueprint (notably without "ID") set forth in Table A below.

1. The Load the field "identifier" is first retrieved from the sensor blueprint JSON-structure. In this example, this field is "false", so the present sensor data interpreter interpreter/converter continues to the next step. An example of a sensor blueprint in which the identifier field is true is given in Example II. set forth below.

"identifier"=false

2. Next, the array "payload" is retrieved from the field "uplink" from the sensor blueprint and a step iterator is set to 0. In this example, the payload comprises an array of strings having 15 entries.

payload=["Battery" "Temperature", "Humidity", "Pressure", "Acceleration-X", "Acceleration-Y", "Acceleration-Z", "Analog Input", "ZEROES]", "Error", "Orientation", "Discrete Input 2", "Discrete Input 1", "shock", "ZEROES8" 1 i=0

3. Read the i-th element is then retrieved from the array payload. In the first iteration name is set to the string "Battery".

name=payload[i]

4. The element name is then retrieved from the list of components. Components is a list of objects. These objects define how to interpret the data received from the sensor. In the first iteration the component with the name "Battery" (=payload[0]) is retrieved.

5, "Battery":{"size":8, "type":"uint", "func":" ", "unit":"Percent"} comp=Battery

6. Next, the elements "size" and "type" is retrieved from comp. In this example for the first iteration size is set to the integer 8 and type is set to the string "uint".

size=comp["size"]
    type comp["type"]

7. The size bits is then retrieved from the beginning of the messages UserData. The position of the extracted bits is saved (j), so previously interpreted parts of UserData are skipped in later iterations. The first 8 bit of the UserData in this example are 96 (0x60 in hexadecimal representation).

data=UserData[j:j+size]

(The indexing in this pseudo code works with bits. In the interpreter the array indexing works in Bytes, so there is logic to extract wanted bits from the byte array).

8. The next step is to interpret the extracted bits as datatype type. Here, the 8 bit extracted are interpreted as an unsigned integer (uint) which results in the number 96, temporary=(type)data 9. The next step is to apply the components field "func" to the resulting number. In this example, for Battery the field "func" is empty so the result is set to 96. An example for field "Temperature" is described below.

result=func(temporary)

10. Next, a field is added with a name "name" to the outgoing JSON-structure out and a result is added as its value. In this example, name is "Battery" and result is 96. out[name]=result 11. Next, iterator i is incremented by 1 and the process returns to step 3 above: The i-th element is then retrieved from the array payload i=i+1

After the first iteration (that is, after the first pass through of steps 1-11, for the example given, the initial JSON output is as follows:{"Battery: 96}

For the sake of completeness and clarity, the remainder of the sensor data-to-JSON process is set forth below for the remaining iterations of i, specifically for i=1 through i=14. The resultant JSON output is then set forth after this description.

The remainder of the STI-MM06 User Data is interpreted/converted as follows:

i=1:
    name="Temperature"
    "Temperature":{"size":16, "type":"uint", "func":"/10-273", "unit":"Celsius" }
    comp=Temperature
    size=16
    type="uint"
    Extracted bits from UserData:
    data=[0x0b 0xb9]=[11 185]
    temporary=3001
    Apply field func to the temporary result. Here func="/10-273".
    result=3001/10−273=27,1
    Add field to JSON-structure:
    {"Battery":96, "Temperature":27.1} i=2:
    name="Humidity"
    "Humidity":{"size":8, "type":"uint", "func" " ", "unit":"Percent" }
    comp=Humidity
    size=8
    type="uint"
    Extracted bits from UserData:
    data=48=0x30
    temporary=48
    func=" "
    Add field to JSON-structure:
    {"Battery":96, "Temperature":27.1, "Humidity":48}
    asd i=3:
    name="Pressure"
    "Pressure":{"size":16, "type" "uint", "func":" ", "unit":"hPa"}
    comp=Pressure
    size=16
    type="uint"
    Extracted bits from UserData:
    data=[3 235]=[0x03 0xeb]
    temporary=1003
    func=" "
    Add field to JSON-structure:
    {"Battery":96, "Temperature":27.1, "Humidity":48, "Pressure":1003} i=4:
    name="Acceleration-X"
    "Acceleration-X":{"size":8, "type":"int", "func":" ", "unit":" " }
    comp=Acceleration-X
    size=8
    type="int"
    Extracted bits from UserData:
    data=0=0x00
    temporary=0 func=" "
Add field to JSON-structure:
  {"Battery":96, "Temperature":27.1, "Humidity":48, "Pressure":1003, "Acceleration-X":0}
i=5, i=6. Analog zu i=4. Jump directly to step 5:
  Extracted bits vom UserData:
  data=1=0x01 for i=5
  data=65=0x41 for i=6
  temporary=1 for i=5
  temporary=65 for i=6
  Add fields to JSON-structure:
  {"Battery":96, "Temperature":27.1, "Humidity":48, "Pressure":1003, "Acceleration-X":0, "Acceleration-Y":1, "Acceleration-Z":65}
i=7:
  name="Analog Input"
  "Analog Input":{"size":16, "type":"uint", "func":" ", "unit":"mV" }
  comp=Analog Input
  size=16
  type="uint"
  Extracted bits from UserData:
  data=[0 0]=[0x00 0x00]
  temporary=0
  func=" "
  Add field to JSON-structure:
  {"Battery":96, "Temperature":27.1, "Humidity":48, "Pressure":1003, "Acceleration-X":0, "Acceleration-Y":1, "Acceleration-Z":65, "Analog Input":0}
i=8:
  name="ZEROES1"
  The field ZEROES is a field that can be used as a place holder. Bits that are marked as ZEROES will get ignored by the interpreter. ZEROES has to be followed by a number. That number of bits will be ignored. In our example the not interpreted Bytes in UserData are:
  [0x28 0x00]=[40 0]
  ZEROES1 states, that the first bit of the next Byte will be ignored.
For the rest of the example, specific bits within the data payload are processed.
Hexadecimal to binary conversion:
  0x28=0b00101000
  0x00=0b00000000
With name="ZEROES1" for i=8 the first bit in 0b00101000 will be ignored (most significant bit)
That leaves us with 0.0 01000.
Continuing from here:
  i=9:
    name="Error"
    "Error":{"size":1, "type":"bool", "func":" ", "unit" " "}
    comp=Error
    size=1
    type="bool"
    Extracted bits from UserData:
    data=0b0
    temporary=false
    func=" "
    Add field to JSON-structure:
    {"Battery":96, "Temperature":27.1, "Humidity":48, "Pressure":1003, "Acceleration-X":0, "Acceleration-Y":1, "Acceleration-Z":65, "Analog Input":0, "Error":false}
  i=10:
    name="Orientation"
    "Orientation":{"size":3, "type":"uint", "func", "uint":" "}
    comp=Orientation
    size=3
    type="uint"
    Extracted bits from UserData:
    data=0b101=5
    temporary=5
    func=" "
    Add field to JSON-structure:
    {"Battery":96, "Temperature":27.1, "Humidity":48, "Pressure":1003, "Acceleration-X":0, "Acceleration-Y":1, "Acceleration-Z":65, "Analog Input":0, "Error":false, "Orientation":5}
  i=11:
    name="Discrete Input 1"
    "Discrete Input 1":{"size":1, "type":"bool", "func":" ", "unit":" "}
    comp=Discrete Input 1
    size=1
    type="bool"
    Extracted bits from UserData:
    data=0b0
    temporary=false
    func=" "
    {"Battery":96, "Temperature":27.1, "Humidity":48, "Pressure":1003, "Acceleration-X":0, "Acceleration-Y":1, "Acceleration-Z":65, "Analog Input":0, "Error":false, "Orientation":5, "Discrete Input 1":false}
  i=12:
    name="Discrete Input 2"
    "Discrete Input 2":{"size":1, "type":"bool", "func":" ", "unit":" " }
    comp=Discrete Input 2
    size=1
    type="bool"
    Extracted bits from UserData:
    data=0b0
    temporary=false
    func=" "
    {"Battery":96, "Temperature":27.1, "Humidity":48, "Pressure":1003, "Acceleration-X":0, "Acceleration-Y":1, "Acceleration-Z":65, "Analog Input":0, "Error":false, "Orientation":5, "Discrete Input 1":false, "Discrete Input 2":false}
  i=13:
    name="shock"
    "shock":{"size":1, "type":"bool", "func":" ", "unit":" " }
    comp=shock
    size=1
    type="bool"
    Extracted bits from UserData:
    data=0b0
    temporary=false
    func=" "
    {"Battery":96, "Temperature":27.1, "Humidity":48, "Pressure":1003, "Acceleration-X":0, "Acceleration-Y":1, "Acceleration-Z":65, "Analog Input":0, "Error":false, "Orientation":5, "Discrete Input 1":false, "Discrete Input 2":false, "shock":false}
  i=14:
    name="ZEROES8"

the rest of the payload is 0x00 which the name ZEROES8 tells the interpreter to ignore.

So, the JSON-structure from the UserData results to:
As a result, the JSON output by the present inventive interpreter/converter resulting from that UserData is as follows:
{"Battery":96,
"Temperature":27.1,
"Humidity":48,
"Pressure":1003,
"Acceleration-X":0.
"Acceleration-Y":1.
"Acceleration-Z":65,
"Analog Input":0,
"Error":false,
"Orientation":5,
"Discrete Input 1":false,
"Discrete Input 2":false,
"shock":false}

Example H: Interpreting Payload with ID (Fictional Payload)

The following is an example showing how sensor data is interpreted/converted when the sensor data uses an identifier to identify different "UserData" content. An exemplary sensor blueprint for use in this Example H is set forth below in Table B.

The key "identifier" is a Boolean number that determines whether the present interpreter/converter recognizes the presence an identifier byte.

In this example, the identifier is true:"identifier":true.

The part of the blueprint that defines different payloads for different identifiers is provided by the fields inside the uplink field:"uplink".
  "uplink":[
  {"id":100, "payload":["Heartbeat" ] },
  {"id":101, "payload":["NFC Text" ] },
  {"id":104, "payload":["Battery" ] },
  {"id":107, "payload":["Pressure" ] }]

Example A

Received payload in a nodes message(UserData):
decimal representation:[100 96]
hexadecimal representation:[0x64 0x60]
The interpretation follows the same logic flow as described above with reference to Example I.
Load field "identifier" from sensor model JSON-structure. Here "identifer" is true, so an extra step will be done.
"identifier"=true
Read the first Byte from the messages payload. In example A the first Byte is 100 in decimal representation.
id=UserData[0]
Load the field "payload" from field "uplink" with corresponding field "id". Here "id"=100 so the loaded field will be:{"id":100, "payload":["Heartbeat" ] }
temporaryField=uplink[id]
Extract array "payload" from loaded field. Here Payload=["Heartbeat"]
  Payload=temporaryField["payload"]
Interpret UserData as shown in 3)
i=0:
  name="Heartbeat"
  "Heartbeat":{"size":8, "type":"uint", "func":" ", "unit":"bpm" }
comp=Heartbeat
size=8
type="uint"
Extracted bits from UserData:
data=[0x60]=[96]
temporary=96
Apply field func to the temporary result. Here func=" ".
result=96
Add field to JSON-structure:
{"Heartbeat":96,}

Example B

Received payload in a nodes message (UserData):
decimal representation:
[107 39 146]
hexadecimal representation:
[0x6B 0x27 0x92]
id=UserData[0]=107
Payload=["Pressure" ]
i=0:
  name="Pressure"
  "Pressure":{"size":16, "type":"uint", "func":"/10", "unit":"Pa" }
comp=Pressure
size=16
type="uint"
Extracted bits from UserData:
data=[0x27 0x92]=[39 146]
temporary=10130
Apply field func to the temporary result. Here func="/10".
result=1013
Add field to JSON-structure:
{"Pressure":1013,}

TABLE A

Exemplary JSON Sensor Blueprint without ID

{
  "name" : "STI-MM06",
  "vendor" : "Synaptic Technologies",
  "type" : "70B3D5C1F000A000",
  "uplink": [
    {
      "payload": [
        "Battery",
        "Temperature",
        "Humidity",
        "Pressure",
        "Acceleration-X",
        "Acceleration-Y",
        "Acceleration-Z",
        "Analog Input",
        "ZEROES1",
        "Error",
        "Orientation",
        "Discrete Input 2",
        "Discrete Input 1",
        "shock",
        "ZEROES8"]
    }],
  "components" : {
    "Temperature" : {
      "size" : 16,
      "type" : "uint",
      "func" : "/10-273",
      "unit" : "Celsius"
    },
    "Battery" : {
      "size" : 8,

| TABLE A-continued |
|---|
| Exemplary JSON Sensor Blueprint without ID |

```
        "type" : "uint",
        "func" : "",
        "unit" : "Percent"
    },
    "Humidity" : {
        "size" : 8,
        "type" : "uint",
        "func" : "",
        "unit" : "Percent"
    },
    "Pressure" : {
        "size" : 16,
        "type" : "uint",
        "func" : "",
        "unit" : "hPa"
    },
    "Acceleration-X" : {
        "size" : 8,
        "type" : "int",
        "func" : "",
        "unit" : ""
    },
    "Acceleration-Y" : {
        "size" : 8,
        "type" : "int",
        "func" : "",
        "unit" : ""
    },
    "Acceleration-Z" : {
        "size" : 8,
        "type" : "int",
        "func" : "",
        "unit" : ""
    },
    "Analog Input" : {
        "size" : 16,
        "type" : "uint",
        "func" : "",
        "unit" : "mV"
    },
    "shock" : {
        "size" : 1,
        "type" : "bool",
        "func" : "",
        "unit" : ""
    },
    "Discrete Input 1" : {
        "size" : 1,
        "type" : "bool",
        "func" : "",
        "unit" : ""
    },
    "Discrete Input 2" : {
        "size" : 1,
        "type" : "bool",
        "func" : "",
        "unit" : ""
    },
    "Orientation" : {
        "size" : 3,
        "type" : "uint",
        "func" : "",
        "unit" : ""
    },
    "Error" : {
        "size" : 1,
        "type" : "bool",
        "func" : "",
        "unit" : ""
    }
  }
}
```

| TABLE B |
|---|
| Exemplary JSON Sensor Blueprint with ID |

```
{
    "name": "SensorBlueprint with ID",
    "vendor": "BehrTech",
    "type":"70B3D5C1F000A001",
    "identifier":true,
    "uplink":[{
        "id": 100,
        "payload":["Heartbeat"]
    },{
        "id": 101,
        "payload":["NFC Text"]
    },{
        "id": 104,
        "payload":["Battery"]
    },{
        "id": 107,
        "payload":["Pressure"]
    }],
    "components": {
        "NFC Text": {
            "size": 0,
            "type": "string",
            "func": "",
            "unit": ""
        },
        "Heartbeat": {
            "size": 8,
            "type": "uint",
            "func": "",
            "unit": "bpm"
        },
        "Battery": {
            "size": 8,
            "type": "uint",
            "func": "",
            "unit": "Percent"
        },
        "Pressure": {
            "size": 16,
            "type": "uint",
            "func": "/10",
            "unit": "hPa"
        }
    }
}
```

As noted above, although blueprints are described hereinabove as comprising JSON text files, those skilled in the computer arts shall appreciate and recognize that other markup languages or other structured file formats may be used to implement the blueprints used by the present interpreter/converter methods and apparatus. Without limiting the scope of the present invention, the blueprints, may comprise, for example, XML, YAML and TOML text files.

Conversion of Human Readable Formatted Information to Machine-Readable Byte Array Data in Downlink Communications from Base Stations to Endpoints/Sensors The exemplary blueprints and sensor data conversion examples set forth above describe how blueprints are defined and used by the present interpreter/converter to interpret and convert machine-readable byte array data transmitted by the plurality of sensors in the uplink into human readable data formats such as, for example, JSON text files. By including additional "downlink" information in the blueprints, the present interpreter/converter converts human readable (and also machine readable) formatted information (such as those implemented as JSON, XML, YAML and TOML text files) into sensor compatible machine-readable byte array data in downlink transmissions from base stations to the sensors (i.e., "endpoints" or "nodes"). Using methods and apparatus similar to those described above with respect to uplink communications, human readable information (such as those described above implemented as JSON, XML, YAML or TOML text files) are converted into machine-readable byte array data in downlink communications (transmissions from base stations to sensors/endpoints/nodes). As described below in more detail, the functionality provided by the present interpreter/converter in the downlink mirrors that provided and described above in the uplink, but in reverse. Rather than converting machine-readable byte array data transmitted in the uplink into human readable formatted data such as JSON text files, the present interpreter/converter functions to convert human readable formatted data into machine-readable byte array data for transmission in the downlink to the sensors.

An exemplary Blueprint is set forth in Table C below that includes information that is used when converting human readable formatted data (such as JSON, XML, YAML or TOML text files) into sensor compatible machine-readable byte array data. As shown in the exemplary blueprint of Table C, a "downlink" field is provided, together with an additional related payload definition and related components which are used in interpreting/converting downlink messages. While the components are useable for both uplink and downlink messages, their purpose is defined by their arrays.

In the exemplary Blueprint set forth in Table C below, an "uplink" field and its associated payload definitions and related components are used for interpreting and converting uplink messages into human-readable formatted data (e.g., JSON text files in some embodiments), while a "downlink" field and its associated payload definition and related components are used for interpreting and converting human-readable formatted data into machine-readable byte array data downlink messages.

TABLE C

Exemplary Blueprint including Uplink and Downlink Fields

```
{
  "name": "Example Sensor Bidi",
  "vendor": "BehrTech",
  "type":"70ABC5C1F000A000",
  "identifier":true, [Note - this defines that the sensor has id fields, which are used when a sensor is
capable of transmitting different types of payload data in the uplink.]
  "uplink":[{
    "id": 101, [Note regarding "id" fields: the "id" fields are not required if only one payload is
required (i.e., "identifier" is false)", as described above with reference to Blueprint EXAMPLE
C and the Exemplary JSON Blueprints set forth in Tables A and B above.]
    "pay-
load":["temperature","temperature_status","humidity_status","analog_out_status","digital_out_status","4bitnumber",
"digitalOut","analogOut"]
  },
  {
    "id": 99,
    "payload":["humidity","12bitnumber","4bitnumber"]
  }],
  "downlink":[{
    "id": 55,
    "payload":["txPeriod","txPower","digitalOut","analogOut"]
  }],
  "components": {
    "temperature": {
      "size": 12,
      "type": "uint",
      "func": "",
      "unit": "degree celsius"
    },
    "temperature_status": {
      "size": 1,
      "type": "bool",
      "func": "",
      "unit": ""
    },
    "humidity_status": {
      "size": 1,
      "type": "bool",
      "func": "",
      "unit": ""
    },
    "analog_out_status": {
      "size": 1,
      "type": "bool",
      "func": "",
      "unit": ""
    },
    "digital_out_status": {
      "size": 1,
      "type": "bool",
      "func": "",
      "unit": ""
    },
    "4bitnumber": {
      "size": 4,
      "type": "uint",
```

TABLE C-continued

Exemplary Blueprint including Uplink and Downlink Fields

```
            "func": "",
            "unit": ""
        },
        "humidity":{
            "size": 16,
            "type": "uint",
            "func": "/100",
            "unit": "percent"
        },
        "12bitnumber":{
            "size": 12,
            "type": "uint",
            "func": "",
            "unit": ""
        },
        "txPower": {
            "size": 8,
            "type": "uint",
            "func": "",
            "unit": "mW"
        },
        "txPeriod": {
            "size": 16,
            "type": "uint",
            "func": "",
            "unit": "s"
        },
        "digitalOut": {
            "size": 8,
            "type": "bool",
            "func": "",
            "unit": ""
        },
        "analogOut": {
            "size": 32,
            "type": "uint",
            "func": "",
            "unit": ""
        }
    }
}
```

Detailed Description of the Exemplary Blueprint of Table C

As shown in the exemplary blueprint of Table C, and similar to the blueprints set forth and described above, the blueprint includes a "name" field which comprises the sensor/blueprint name; a "vendor" field which comprises the vendor of the sensor associated with the exemplary blueprint; the sensor "type" field which comprises the sensor-type EUI identifier in hexadecimal. These fields are used to uniquely identify the blueprint and to provide human readable meta information. The next field in the exemplary blueprint is the "identifier" field. As described above with reference to the Example C blueprint (and noted in the blueprint of Table C), the identifier field is used by the interpreter/converter to determine if the sensor is capable of transmitting different types of payload data. If so, the identifier will be "true", else it will be "false". If the identifier field is set to true, the payload data transmitted by the sensor must include the correct "id" in the uplink message to enable the interpreter/converter to choose the correct payload definition to use. In some embodiments (for example, those adhering to the TS-UNB standard), the sensor transmits this "id" byte in a header of the message transmitted by the sensor. In the example given, the blueprint defines a sensor capable of transmitting different types of payload data and the identifier field is "true". The blueprint therefore includes one or more "id" fields used to correctly identify and interpret the sensor payload data currently being transmitted by the associated sensor in the uplink.

As noted above, the exemplary blueprint of Table C includes both an "uplink" and a "downlink" field. As shown in the exemplary blueprint of Table C, and similar to the blueprints described above, in addition to the "id" fields, the uplink field include payloads (or payload definitions) for each payload data type a sensor is capable of transmitting in the uplink. The payloads comprise a list or array of components, and the components are further defined in the components array section of the blueprint. In the example given, two payloads are defined for uplink transmissions transmitted by the sensor associated with the blueprint: (1) the payload definition associated with id=101 comprises: ["temperature", temperature_status", "humidity_status", "analog_out_status", "digital_out_status", "4bitnumber", "digitalOut", "analogOut" ]; and (2) the payload definition associated with id=99 comprises: ["humidity", "12bitnumber", "4bitnumber" ]. As before, each of the components listed in the array of components set forth in the payload definition are defined in the components section of the blueprint. The present interpreter/converter operates in the uplink as described above with reference to the blueprints and examples set forth above in interpreting and converting the sensor payload machine-readable byte array data into human readable formatted data.

In the exemplary blueprint, the downlink field includes an "id" field and a payload definition. In this example, the "id"=55, and the payload associated with this "id" comprises: ["txPeriod", "txPower", "digital Out", "analog Out"]. As before, the "downlink" payload comprises components (such as "txPeriod" and "txPower", for example) that are further defined in the components section of the blueprint. Similar to the function performed by the present interpreter/converter in the uplink, the downlink payload definition and its related components determine how the interpreter/converter converts human readable formatted information into machine-readable byte array data for transmission to the sensors. This interpretation and conversion process is described now with reference to the blueprint set forth in Table C and an exemplary human-readable formatted data input.

An Exemplary Downlink Interpretation/Conversion

An exemplary conversion from an exemplary human readable input to machine readable data byte arrays using the exemplary Blueprint set forth in Table C above is set forth below:

For a human readable input given as set forth below:
Human Readable Input:

```
{
  "epEui": "70ABC5C1F000A000",
  "id": 55,
  "txPeriod": 60,
  "txPower": 25,
  "digitalOut": true,
  "analogOut": 124678
}
``` and using the Blueprint set forth in Table C above, the following output results:

Machine Readable Output:
[0x37 00 3c 19 01 00 01 e7 06]

When the present interpreter/converter receives the human readable input as set forth above, it recognizes the EUI associated with the blueprint of Table C. As this is a downlink message being sent by a base station to a sensor associated with this blueprint, the interpreter/converter looks into the blueprint associated with the sensor and identifies a schema of a downlink message corresponding to id=55. The schemas of downlink messages with sensors capable of receiving several different types of messages are identified by their "id" numbers, in this case the schema has an id=55. As noted above, the payload definition associated with this id comprises an array of four components:"txPeriod", "txPower", "digital Out", and "analog Out", Each of these components are fully defined in the components section of the blueprint. For example, "txPeriod" is defined as comprising:{"size":16, "type":"unit", "func":" ", "unit":"s" }. As noted in the examples given above for uplink communications, the payload definition and its associated components define how the interpreter/converter converts the human readable input (part of which is ""txPeriod":60", "txPower: 25", etc.) into machine readable byte array data that is compatible with the sensors or end nodes.

In order to convert the human readable format to machine-readable byte array sensor compatible messages, the interpreter/converter simply extracts the values set forth in the human readable message in accordance with the payload definition and the related components and converts them into hexadecimal byte array data. Specifically, "id" has a size of 1 byte and decimal "55" translates to hex "3T", "TxPeriod" is defined in the TxPeriod component as having a size of 2 bytes ("size"=16 bits), and it is defined in this component as an unsigned integer. The decimal "60" value given in the input for "txPeriod" therefore translates to hex 003c, "TxPower" has a size of 1 byte ("size"=8) and the decimal "25" input value translates to hex 19, "digitalOut" has a size of 1 byte ("size"=8) and the "true" value translates to a hex 01. Finally, "analogOut" is defined in its component as having a size of 4 bytes ("size"=32), and its input value is given as decimal "124678". This therefore translates to a hex 00 01 e7 06. Therefore, the human readable input set forth above is converted to the machine-readable byte array [0x37 00 3c 19 01 00 01 e7 06] as noted above.

Those skilled in the LPWAN and networking computer arts shall recognize that if the machine-readable byte array "output" set forth above (that is, the hexadecimal machine-readable byte array value "0x37 00 3c 19 01 00 01 e7 06"), were provided as input to the present interpreter/converter in the uplink, the machine-readable byte array would be converted into the human readable "input" set forth above. All that would be necessary to accomplish this function is to include an additional "uplink" field and related "id" and payload definition to the exemplary blueprint of Table C. The additional uplink field would be identical to the downlink field described above, with the only exception being it would comprise an "uplink" field. More specifically, the uplink field would comprise:"uplink":[{"id":55, "payload": ["txPeriod","txPower","digitalOut","analogOut"}])]. If the blueprint included this additional uplink field, the machine-readable byte array data (set forth above as an output of the converter) would be converted in the uplink into the human readable text (set forth above as an input to the converter). Thus, the present interpreter/converter interprets and converts data in both the uplink and downlink of the LPWAN (i.e., the interpreter/converter "bidirectionally" interprets and converts data transmitted to and from the sensors or end nodes).

Figure 3B:
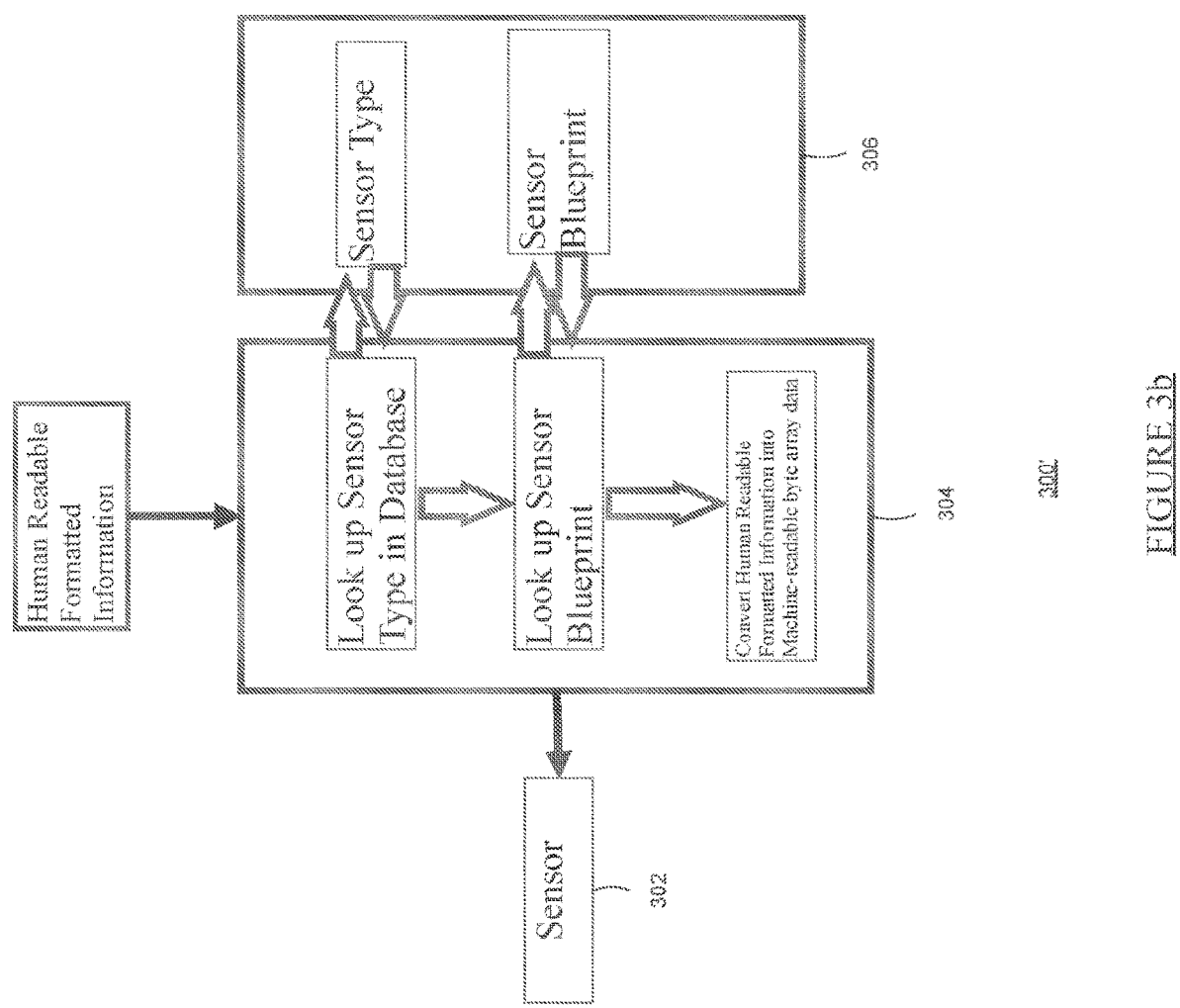
FIG. 3b shows an exemplary data flow showing how human readable formatted information is interpreted and converted to sensor compatible machine-readable byte array data in the downlink, using the sensor data interpreter/converter of the present invention.

FIG. 3b shows an exemplary data flow 300' showing how human readable formatted information is interpreted and converted to sensor compatible machine-readable byte array data in the downlink, using the sensor data interpreter/converter of the present invention. As shown in FIG. 3b, human readable formatted information is input to the interpreter/converter 304 for interpretation and conversion into machine-readable byte array data to be transmitted to a selected sensor 302. As described above, and as shown in the data flow 300' of FIG. 3b, in some embodiments the interpretation/conversion is performed by the interpreter/converter 304 by (1) looking up the sensor type set forth in the human readable formatted information (which is, as noted above, the sensor type that is associated and corresponds to the selected sensor's LPWAN EUI contained in the human formatted information), (2) looking up the sensor blueprint associated with the sensor type, and (3) interpreting/converting the human readable formatted data into machine-readable byte array data in accordance with the sensor blueprint associated with the sensor type. As shown in FIG. 3b, and as described above in more detail with reference to FIG. 3a, in some embodiments, the sensor type and its associated and corresponding blueprint is stored in a database 306. After performing the conversion, the machine-readable byte array data is output by the interpreter/converter 304 for transmission to the sensor 302 that is associated with the blueprint used to make the conversion.

Generalized Description of Blueprints designed for use with the present Interpreter/Converter Several exemplary blueprints are set forth above and are described with reference to the present interpreter/converter methods and apparatus. For example, Table C contains an exemplary blueprint having both uplink and downlink fields. In general, the blueprints should be designed in accordance with the generalized description provided now.

The blueprint starts with its mandatory "name", "vendor" and "type-eui" fields. Those fields are used to uniquely identify a blueprint and provide human readable meta information. The blueprint must also include a "components" section or "array". The components array defines information for every possible input and output the associated node or sensor has. Every component of the components array begins with a component "name". The component name must be unique within a given blueprint. A component comprises the following fields:

be defined in the blueprint. In this case, a payload should begin with an "id" field. In some embodiments, a node would be required to send a corresponding "id" byte in the header of the message to enable the present interpreter/converter to select the correct payload to interpret and convert, "Uplink" arrays may also include a "route" field, which enables the interpreter/converter to choose a network routing path for an associated message.

A summarized description of every field of the blueprint is set forth in Table D below:

TABLE D

Summary of Description of Generalized Blueprint

| | Object | Type | Description |
|---|---|---|---|
| { | name | string | sensor/blueprint name |
| "name":"Example Sensor Bidi", | vendor | string | vendor name |
| "vendor": "BehrTech", | type-eui | string | unique EUI |
| "type-eui":"70ABC5C1F000A000" | identifier | bool | defines whether multiple pay-loads are set |
| "identifier":true, | uplink | array | array uplink messages |
| "uplink":[{ | id | int | identifies a specific payload |
| "id": 101, | payload | array | array of components within one message |
| "payload":["temperature"4bitnumber"] | downlink | array | array of downlink messages |
| }, | components | array | array of components |
| { | size | int | size of a component in bit |
| "id": 99, | type (in component) | string | type of a component for example uint,bool . . . |
| "route":"myroute" | func | string | mathematical function to calculate this components value |
| }], | unit | string | unit of this component for example degrees celcius |
| "components":{ | route | string | name of a routing path for that message |
| "temperature": { | | | |
| "size":12, | | | |
| "type": "uint", | | | |
| "func": "", | | | |
| "unit": "degree celcius" | | | |
| }, | | | |
| "4bitnumber": { | | | |
| "size":4, | | | |
| "type": "uint", | | | |
| "func": "", | | | |
| "unit": "", | | | |
| } | | | |
| } | | | |

| | |
|---|---|
| "size" | This field gives the size of the component in bits. |
| "type" | This field gives the data type of the component. For example, "uint" is used for an unsigned integer. |
| "func" | This field allows mathematical functions to be executed on the given component in the interpretation process. |
| "unit" | This field gives the unit of a component. For example, "degrees Celsius". |

As described above with reference to the blueprint set forth in Table C, the blueprint may also include uplink and downlink fields, including related payload arrays or payload definitions. The payloads comprise a list or array of components, and the components are further defined in the components array. As described above, in the uplink, "uplink" components (those set forth in the uplink payload) are used to interpret and convert machine-readable byte array data into human readable formatted information. In the downlink, "downlink" components (those set forth in the downlink payload) are used to interpret and convert human readable data structures into machine-readable byte array data.

The blueprint may also include an identifier, or "id" field. If the "identifier" field is set to "true", multiple payloads can The blueprints used to define sensors for use with the present sensor data interpreter/converter are structured to efficiently use the limited data bandwidth available in LPWA networks, and especially in LPWANs complying with the TS-UNB standard. Messages are transmitted on a byte basis in LPWANs complying with the TS-UNB standard. As a consequence, unless the disclosed blueprints and interpreter/converter methods and apparatus are utilized, if a certain component does not use a full byte of data, the remainder of the byte is filled with zeros prior to transmission. For example, assume a temperature sensor is defined as transmitting information in 12 bits. Because messages are transmitted on a byte basis, two bytes are used to transmit the 12 bit temperature value sensed by the sensor. The remaining 4 bits (of the two byte transmission) are "filled up" with meaningless information, typically with four zeros. As a consequence, in systems not using the present blueprints and present interpreter/converter, bandwidth is disadvantageously and inefficiently used to transmit data that contains no information. As noted above, LPWANs are highly constrained in terms of data payloads (e.g., only 10 bytes of a message) and therefore every bit that is transmitted is extremely valuable and therefore should be used as efficiently as possible. The size of TS-UNB payloads can be increased by adding a sub-packet to the transmission with the size of one byte.

By including components to the blueprint that have smaller, e.g., Boolean datatypes, previously unused payload data bits (bits that were previously filled with zeros) can be utilized to transmit useful information. Examples of such components are provided in the exemplary blueprint of Table C. For example, as set forth therein, the blueprints may include the following Boolean-type components: "temperature_status", "humidity_status", "analog_out status", and "digital_out status" as set forth in the exemplary blueprint of Table C. Each of these components are only 1 bit in size. The present interpreter/converter apparatus can use such components to more efficiently transmit data in the LPWAN in which it is implemented. Rather than transmitting the temperature sensed by a sensor in 12 bits and filling the remaining unused bits with zeros, the blueprint can define the payload to include other useful information in the transmission. As shown in the exemplary blueprint of Table C, one of the payloads comprises an array of components including not only "temperature" (which is transmitted in 12 bits as defined by the temperature component), but also "temperature_status", "humidity_status", "analog_out_status", and "digital_out_status" (all of which Boolean data types require only 1 bit to be transmitted). As can be seen, the blueprints are designed in such a manner that no bits of information transmitted to or from the sensors are wasted. Consequently, the efficiency of data transmissions within the LPWAN is improved using the presently disclosed interpreter/converter and the defined blueprints. This aspect of the blueprint design and present interpreter/convert minimizes payload data overhead and increases overall network scalability and performance.

Another efficiency improvement is achieved using the present blueprints in LPWANs adhering to the TS-UNB standard. Due to the telegram-splitting technique utilized by TS-UNB, information is typically transmitted in 10 bytes. Telegrams/messages typically have a 10 byte payload. However, if an 11 byte payload is desired to be transmitted, two telegram messages would need to be sent (that is, 20 bytes of data would need to be transmitted). The overhead associated with the 10 byte payloads would need to be transmitted twice, therefore wasting invaluable data bandwidth. Using the present blueprint and methods described herein, a 2 byte sub-packet is transmitted in addition to the 10 bytes (one sub-packet equals 2 bytes). The blueprints are designed to facilitate this data transmission efficiency. The blueprints are designed to optimize the data transmission efficiencies. The blueprints ensure that the sensor payloads are defined in such a way that every bit, or nearly every bit, that is transmitted in the LPWAN is utilized.

Blueprints also serve as compression templates, when used to interpret and convert transmissions in both the uplink and the downlink. As noted above, if a blueprint is not previously stored or available in a database or data lookup that is directly accessible to the interpreter/converter, the blueprint can be provided by a selected sensor or end point in a TS-UNB LPWAN. The highly limited bandwidth in a TS-UNB based LPWAN requires that the blueprint transmitted by the sensor or endpoint be "compressed". In some embodiments, in order to achieve this "blueprint compression", the end-node or sensor transmits only the values of the blueprint and not the entire blueprint structure itself. The backend system receives the transmitted blueprint values and parses them into an "empty" blueprint and subsequently stores it in the database. After this transmission the blueprint lookup functions as described above through the backend (as described above with reference to the backend computer 206 of FIG. 2). Similar methods may also be used when transmitting messages in the downlink to the end-node, again saving bandwidth. Additionally, the described methods save significant power as power consumption is significantly influenced by transmit time ("on air" time) and by the amount of time a device spends listening on a radio channel. This is also an essential function for sensors operating in LPWANs as sensors are typically battery-operated and power-optimized.

Blueprints can be made in accordance with the generalized description set forth above either by sensor manufacturers or by LPWAN system designers, or both. However, in order to take advantage of the many benefits provided by the present interpreter/converter and the described blueprints, blueprints should be made in accordance with the present disclosure (for example, in accordance with the generalized description of blueprints set forth above).

One significant advantage offered by the present interpreter/converter and its related blueprints is the very flexible and "modular" solution offered thereby. Prior art approaches adopted "hardcoded" solutions typically implemented in the "backend" processing systems (such as the "backend" described above with reference to the LPWAN 200 of FIG. 2). These prior art systems were somewhat inflexible and could not easily accommodate newly developed sensors having advanced capabilities and transmission requirements as compared to older sensors. If an older sensor was revised to provide a new feature, or if it had a firmware update performed on it (to, for example, increase its functionality or accuracy), or if new sensors were added to the LPWAN, such changes were difficult to account for using the prior art "hardcoded" backend processing solutions. Significant changes had to be made to the "hardcoded" backend processing implementations. In stark contrast, by using the disclosed interpreter/converter and blueprints of the present invention, changes in sensor functionality or requirements can easily be accommodated by simply revising old blueprints or adding new ones. No changes or updates need to be made to the previously implemented backend processing. For example, advantageously, using the disclosed interpreter/converter and related blueprints, when a sensor manufacturer provides future updates to extend sensor functionality (for example, to enable a previously unused hardware component to function in the sensor), this is easily accommodated by simply having the manufacturer update an existing blueprint or provide a new blueprint for use with the present interpreter/converter. The backend is able to immediately process the new sensor data without any changes to previously implemented backend processing systems. This provides significant flexibility advantages and update time savings as compared to the prior art approaches.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. An interpreter/converter apparatus for use in a Low Power Wide Area Network (LPWAN) wherein the LPWAN includes a plurality of sensors in communication in the LPWAN, and wherein machine-readable byte array messages are received from the plurality of sensors in an uplink, comprising:
    (a) a transceiver capable of receiving machine-readable byte array sensor data from the plurality of sensors in the uplink, wherein each sensor has a corresponding and associated LPWAN EUI uniquely identifying each sensor in the LPWAN, and wherein each sensor also has a corresponding sensor type, and wherein each sensor type has an associated and corresponding sensor-type identifier that identifies the sensor type;
    (b) at least one blueprint configured to determine how the interpreter/converter apparatus processes and converts data received from sensors having a selected sensor type, wherein the blueprints are associated with and correspond to sensors of the same or similar sensor type, and with their associated and corresponding sensor-type identifiers, and wherein a sensor-type identifier that is associated with a selected sensor references an associated and corresponding blueprint for use in processing data transmitted to or from the selected sensor;
    (c) a data lookup device containing the blueprints, wherein the blueprints are referenced in accordance with their associated and corresponding sensor-type identifiers; and
    (d) a converter in communication with the transceiver and the data lookup device, wherein the converter accesses a selected blueprint from the data lookup device associated with and corresponding to the sensor-type identifier associated with the selected sensor, and, in accordance with the selected blueprint, the converter processes sensor data received from the selected sensor in the uplink and converts it into human readable formatted information;
    wherein each blueprint comprises:
        (i) a sensor name field;
        (ii) a sensor vendor field;
        (iii) a sensor type field;
        (iv) an identifier field; and
        (v) an uplink field;
    wherein the uplink field comprises payload definitions comprising an array of components, wherein the components define how the apparatus processes the data payloads received by the apparatus from the sensors in the uplink; and
    wherein the component comprises:
        (1) a size field indicative of the size of the component;
        (2) a type field indicative of a data type of the component;
        (3) a function field including mathematical functions to be executed on the component; and
        (4) a unit field indicative of the unit of the component.

2. The interpreter/converter apparatus of claim 1, wherein the LPWAN is bidirectional and machine-readable byte array messages are transmitted to the plurality of sensors in a downlink, the transceiver being capable of transmitting messages to the plurality of sensors in the downlink, at least one blueprint to process and convert data transmitted to sensors having a selected sensor type, and the converter converting human readable formatted information into machine-readable byte array messages for transmission in the downlink to the selected sensor.

3. The interpreter/converter apparatus of claim 2, wherein each blueprint further comprises:
    (vi) a downlink field.

4. The interpreter/converter apparatus of claim 3, wherein the downlink field comprises further payload definitions comprising an array of further components, wherein the further components define how the apparatus processes the data payloads transmitted by the apparatus to the sensors in the downlink.

5. The interpreter/converter apparatus of claim 4, wherein the further components define every possible input that can be transmitted to an associated sensor.

6. The interpreter/converter apparatus of claim 4 or claim 5, wherein the further component comprises:
    (a) a further size field indicative of the size of the further component;
    (b) a further type field indicative of a data type of the further component;
    (c) a further function field including mathematical functions to be executed on the further component; and
    (d) a further unit field indicative of the unit of the further component.

7. The interpreter/converter apparatus of claim 1 or 2, wherein the blueprints define multiple data payloads comprising different and multiple data components for the sensors associated with and corresponding to the blueprints.

8. The interpreter/converter apparatus of claim 7, wherein the blueprints include an identifier configured to identify the multiple data payloads.

9. The interpreter/converter apparatus of claim 1, wherein the components define every possible output that can be transmitted by an associated sensor.

10. The interpreter/converter apparatus of claim 1, wherein the uplink field further comprises at least one payload identifier identifying multiple data payload types that may be transmitted by a multiple payload sensor, and wherein the multiple payload sensor is capable of transmitting multiple data payloads of different types.

11. The interpreter/converter apparatus of claim 1, wherein the LPWAN comprises a TS-UNB-based LPWAN.

12. A method of interpreting and converting sensor data received from a plurality of sensors in communication with a Low Power Wide Area Network (LPWAN) into a machine and human readable formatted information, the method comprising:
    (a) receiving sensor data from a selected sensor, wherein the selected sensor has a corresponding and associated LPWAN EUI uniquely identifying the selected sensor, and wherein every sensor has a corresponding sensor type, and wherein each sensor type has an associated and corresponding sensor-type identifier that identifies the sensor type;
    (b) defining at least one blueprint configured to determine how the interpreting method processes and converts sensor data received from a sensor of a selected type, wherein the blueprints are associated with and correspond to sensors of the same or similar sensor type, and with their associated and corresponding sensor-type identifiers, each blueprint comprising text files, the text files comprising:

(1) one or more components referenced by an associated component name, wherein the one or more components include:
(A) the associated component name;
(B) a size indicating the size of a data payload received from the plurality of sensors;
(C) a data type indicating the type of data contained in the data payload; and
(D) one or more optional mathematical functions performed on the data payload;
(c) accessing a selected blueprint in accordance with a sensor-type identifier corresponding to and associated with the selected sensor; and
(d) converting the sensor data received from the selected sensor in step (a) into machine readable and human readable formatted information in accordance with the blueprint accessed in step (c); and
wherein the blueprint further comprises an identifier true/false field, wherein the identifier true/false field indicates whether the first byte of the data payload comprises a payload identifier.

* * * * *